United States Patent [19]

Onoda et al.

[11] 4,260,883
[45] Apr. 7, 1981

[54] OPTICAL MEASUREMENT SYSTEM

[75] Inventors: Seiichi Onoda, Tokorozawa; Shoji Yamada, Hachioji; Yasuo Minai; Minoru Maeda, both of Hinodemachi; Shin Kita, Kokubunji; Mitsuo Tanaka, Ohme, all of Japan

[73] Assignee: Hitachi, Ltd., Tokyo, Japan

[21] Appl. No.: 12,026

[22] Filed: Feb. 14, 1979

[30] Foreign Application Priority Data

Feb. 15, 1978 [JP] Japan .................... 53-15395
Jul. 26, 1978 [JP] Japan .................... 53-90465

[51] Int. Cl.³ ............................. G01N 2/22
[52] U.S. Cl. .................... 250/226; 250/345
[58] Field of Search ......... 250/226, 227, 339, 345; 356/320, 411, 435

[56] References Cited

FOREIGN PATENT DOCUMENTS 1453938 10/1976 United Kingdom .

Primary Examiner—David C. Nelms
Assistant Examiner—Darwin R. Hostetter
Attorney, Agent, or Firm—Craig and Antonelli

[57] ABSTRACT

An optical measurement system for eliminating the influences of time variations on light sources, transmission lines, photo detectors, etc. The system includes light sources which generate two pulse-shaped optical signals of different light wavelengths with a portion of the optical signals being transmitted to a measuring part in a distant place by a transmission line. In the measuring part, a change of a measured object is converted into a variation in the quantity of transmission of light, and the optical signal subjected to the variation is transmitted to a signal processing portion by a transmission line. The varied optical signal is converted into a first electric signal by a photo detector. Another portion of the optical signals from the light sources is converted into a second electric signal by another photo detector. A signal processing circuit provides a measurement output indicative of the quantity of change of the measured object as a function of at least one ratio of the first and second electric signals.

8 Claims, 13 Drawing Figures

OPTICAL MEASUREMENT SYSTEM

LIST OF PRIOR ART (37 CFR 1.56(a))

The following reference is cited to show the state of the art: A. L. Harmer, "Optical Instrumentation Using Optical Fiber Technology", IOOC '77, C6-3, p 473 (1977)

BACKGROUND OF THE INVENTION (1) Field of the Invention

This invention relates to an optical measurement system. More particularly, it relates to a system wherein a physical change of a measured object is converted into an optical intensity change, which is measured in a position or place remote from the measured object.

(2) Description of the Prior Art

The so-called telemetering for measuring physical changes of measured objects located in distant places, e.g., changes in the position of the pointer of a measuring instrument, the level of a liquid surface, the position of an object, etc., has heretofore been well known. In conventional telemetering, a signal detected in the place of measurement is transmitted to another place after converting it into an electric signal in many cases. However, a measuring portion or a transmitting portion is susceptible to the influences of surrounding conditions such as a voltage or current, opening or closure of a power switch and a temperature fluctuation, and countermeasures against the disturbances are sometimes required. For example, from the standpoint of avoiding an explosion, it is undesirable to arrange electric appliances in the area of measurement.

In view of such drawbacks, there has also been proposed a telemetering system in which both a measuring portion and a transmitting portion are constructed of optical systems.

In a prior-art optical measurement apparatus of this type, in order to eliminate the influences of time variations on light source means and the transmitting portion, two split light beams are modulated by signals of different frequencies, whereupon they are sent to the measuring portion through an identical transmission line. In the measuring portion, one of the two split light beams is passed through a measured object, while the other light beam is superposed on the light beam having passed through the measured object. The light beams are sent via a transmission line of a return path to a signal processing portion, in which they are converted into electric signals. By exploiting the different modulation frequencies, the signals are separated. A physical change of the measured object in the measuring portion is measured on the basis of the ratio between the separated signals.

With the prior-art optical measurement apparatus, however, in a case where a single light source is utilized for preparing the two modulated light beams, a bandpass filter and an optical chopper are required. On the other hand, in a case where two light sources of different wavelengths are utilized, a problem of drifting of the light sources cannot be eliminated. Further, the processing circuit for the received optical signals requires two lock-in amplifiers. When a high-precision measurement is intended, the characteristics of the two lock-in amplifiers are required to be identical, which makes the apparatus expensive.

SUMMARY OF THE INVENTION

It is accordingly, a principal object of the invention to provide a system wherein a physical change of a measured object located in a distant place is converted into an optical change, which change is stably and precisely measured by simple devices without employing any electric appliance in a measuring portion.

Another object of this invention is to provide an optical measurement system wherein a requirement for any mechanical appliance operating at all times, such as optical chopper, is eliminated in a light source portion and a transmitting portion and wherein the influences of variations with the lapse of time or drifting by various causes are eliminated.

In order to accomplish the objects, this invention provides an optical measurement system having a light generation source for generating two pulse-shaped optical signals of different wavelengths, a transducer which varies a quantity of transmitted light depending upon a physical change of a measured object, first and second optical detectors which convert optical output signals of the transducer and the optical signal generating source into electric signals, respectively, an optical transmission line which couples the optical signal generating source, the transducer and the optical detectors, and a signal processing circuit which obtains a ratio of the outputs of the first and second optical detectors and a ratio of the outputs of the two optical signals corresponding to the different wavelengths, thereby to detect a displacement in the transducer.

According to the optical measurement system of this invention, it is unnecessary to incorporate any electrical system or mechanical system in a transmission system for optical components which extends from an output part of the light generating source to the optical detectors, and it is also unnecessary to carry out optical modulations with signals of different frequencies.

Further, as will be explained as to embodoments, the influences of time variations on the light sources, the transmission line and the optical detectors can be eliminated.

The above-mentioned and other objects and features of this invention will become more apparent from the following detailed description taken in conjunction with the drawings.

BRIEF DESCRIPTION OF THE DRAWINGS

FIG. 3 is a diagram illustrative of the relationship between the wavelength of light and the refractive index for explaining the operation of a prism used in the embodiment of FIG. 1.

DESCRIPTION OF THE PREFERRED EMBODIMENTS

Figure 1:
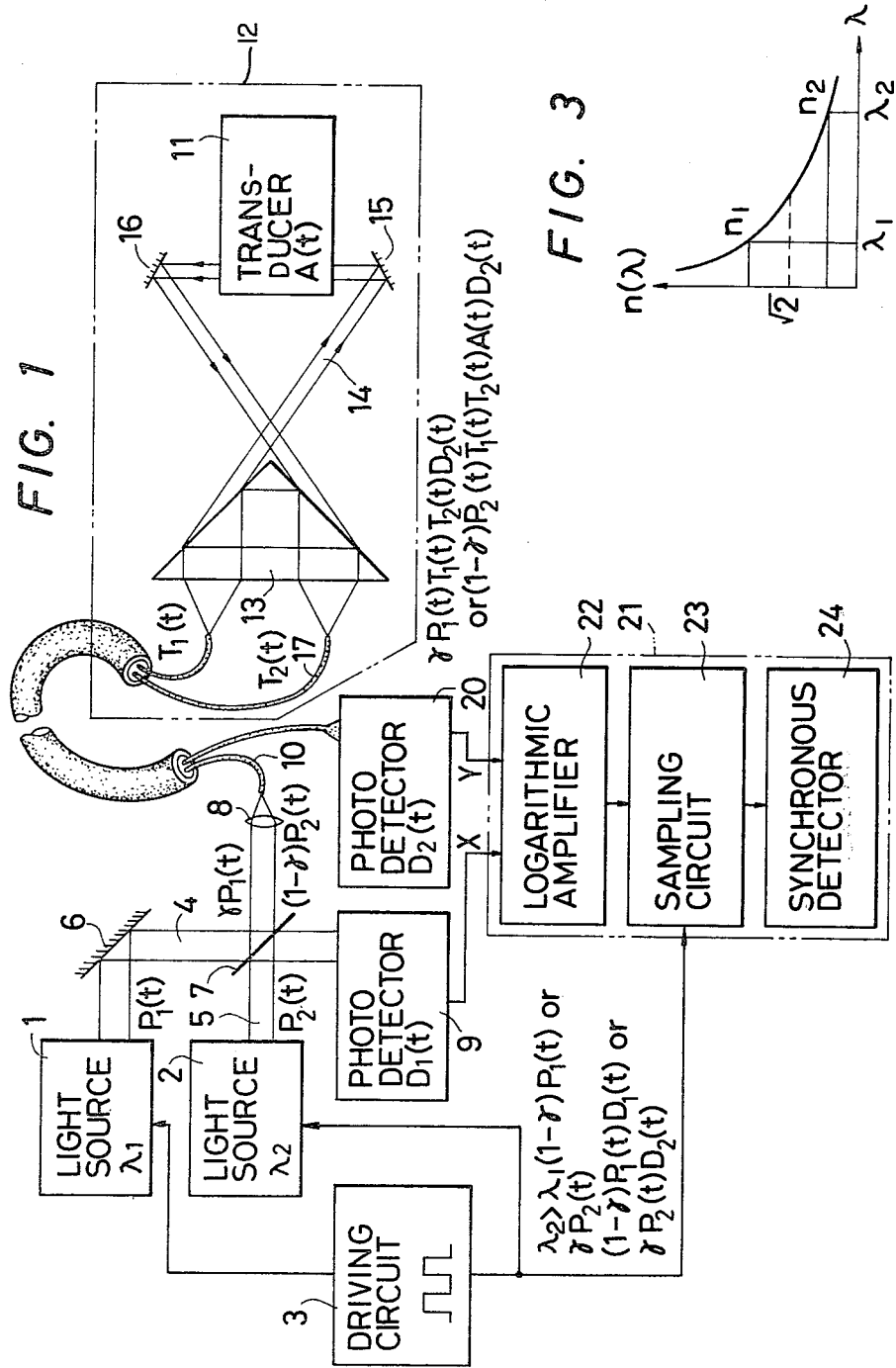
FIG. 1 is a block diagram which shows the construction of an embodiment of an optical measurement system according to this invention.

FIG. 1 is a block diagram which shows the construction of an embodiment of an optical measurement system according to this invention. Referring to the figure, numerals 1 and 2 designate two light sources whose output lights have different wavelengths. The output levels of the light sources 1 and 2 are denoted by $P_1(t)$ and $P_2(t)$, respectively. The two light sources effect the on-off operations alternately by means of an alternate driving circuit 3. The alternating frequency of the driving circuit 3 can be arbitrarily set within a range of from several Hz to several tens MHz.

An output light beam 4 from the first light source 1 is reflected by a mirror 6. Owing to a half mirror or beam splitter 7, a part of the output light beam is led to a lens 8, and another part is applied to a first photo detector (for example, photodiode) 9 to be converted into an electric signal. On the other hand, also an output light beam 5 from the second light source 2 has a part thereof applied to the lens 8 and another part thereof applied to the first detector 9 by the beam splitter 7. The light beams applied to the lens 8 are put into an optical fiber 10 forming a transmission line for a sending path, and are transmitted to a measuring portion 12 located in a distant spot. In the measuring portion 12, the output beams from the optical fiber are projected on a prism 13.

Here, by appropriately setting the refractive index of the material of the prism and the incidence angle of the combined light beam, the beam from the second light source becomes an output beam 14, which passes through the prism 13 again via mirrors 15 and 16 and is brought into an optical fiber 17 forming a transmission line for a returning path. An output from the optical fiber 17 is applied to a second photo detector 20 to be converted into an electric signal. A mechanism such as a transducer 11 with the degree of transmission of the light beam 14 is varied in accordance with a change of a measured object (and which shall be called the "attenuation mechanism") is arranged in the path of the light beam 14 in the measuring portion.

On the other hand, the light beam from the first light source repeats reflections within the prism 13 so as to be directly brought into the optical fiber for the returning path in superposition on the beam path of the second light source.

The prism 13 may be constructed as a prism having a vertical angle of 90° and formed of a material which exhibits a spectral refractive index characteristic as illustrated in FIG. 3. Since the refractive index differs depending on the wavelength, the wavelengths of the lights of the two signal sources as denoted by $\lambda_1$ and $\lambda_2$ are set into a relationship illustrated in FIG. 3, and the entrance angle from the sending-path optical fiber into the prism and the exit angle from the prism into the returning-path optical fiber are made 90°. Thus, the light of the shorter wavelength $\lambda_1$ can repeat the total reflections within the prism to be directly returned into the returning-path optical fiber, while the light of the longer wavelength $\lambda_2$ can be separated as shown in FIG. 1. In an actual arrangement, optical lenses are disposed between the prism and the input and output ends of the optical fibers.

Although a prism has been illustrated in the embodiment, it is to be understood that an optical device having a similar function such as a hot mirror, a cold mirror, an optical filter and a diffraction grating can be employed.

The electric outputs X and Y of the first and second photo detectors 9 and 20, respectively, are applied to a signal processing circuit 21. The signal processing circuit 21 is constructed of an arithmetic circuit 22 for obtaining the logarithmic value of the ratio of the outputs X and Y, a circuit 23 for sampling the outputs of the circuit 22, and a detector 24 for synchronously detecting the sampled signals. An output from the synchronous detector 24 accurately represents the variation of the light beam 14 caused by the change of the measured object in the measuring portion 12.

The operation of the measurement system will now be explained quantitatively. The reflection factor of the beam splitter 7 is set to be $\gamma$. Accordingly, the transmission factor becomes $(1-\gamma)$. The attenuation coefficients of the sending and returning optical fibers are respectively denoted by $T_1(t)$ and $T_2(t)$ (attenuation factors based on the difference of the wavelengths are substantially negligible, and are therefore assumed to be equal). The change of the measured object in the measuring portion 12 is represented by $A(t)$. The conversion coefficients of the detectors 9 and 20 are respectively denoted by $D_1(t)$ and $D_2(t)$.

Figure 2:
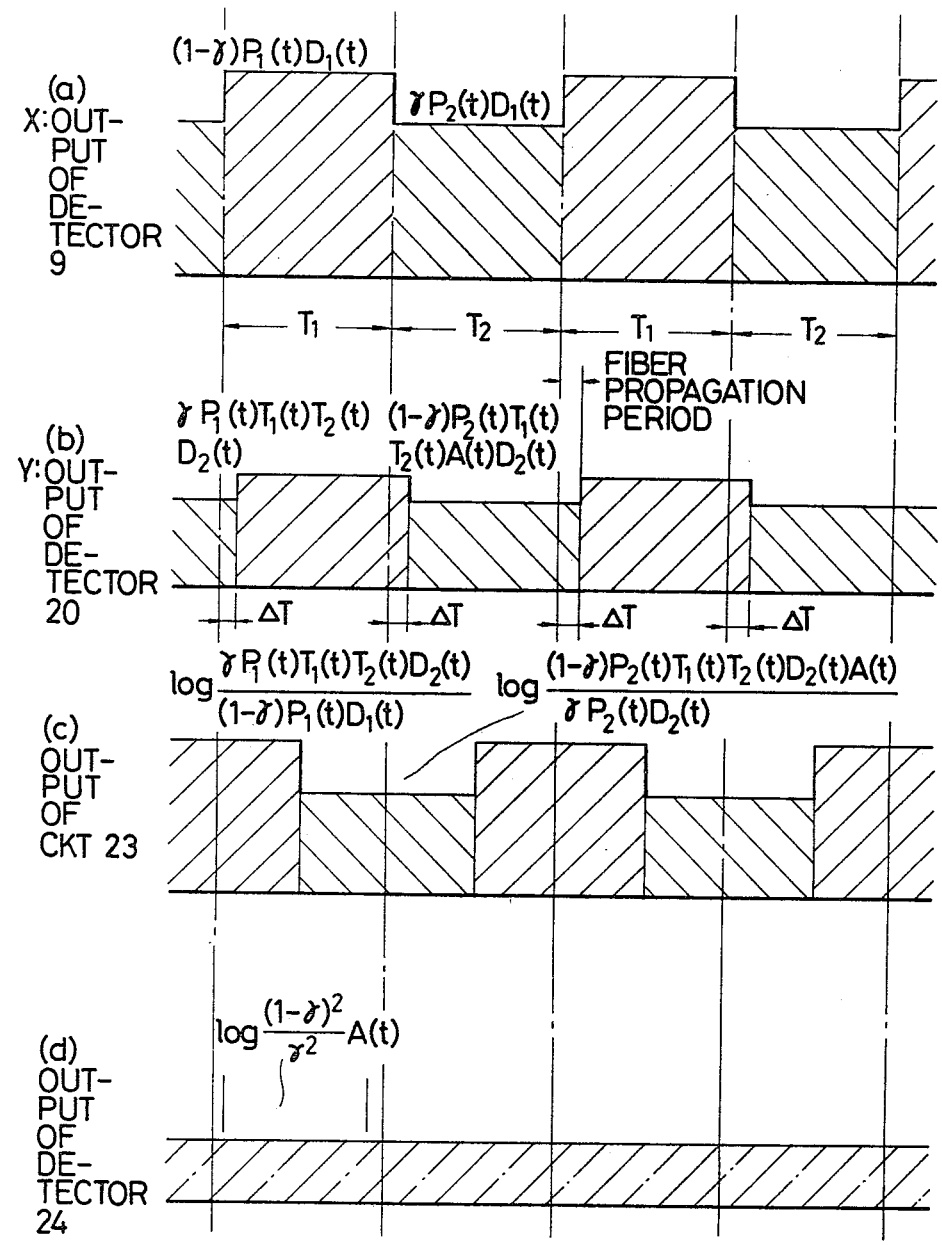
FIG. 2 is a waveform diagram for explaining the operation of the embodiment shown in FIG. 1.

FIG. 2 is a waveform diagram which illustrates the states of the outputs from the first and second photo detectors 9 and 20 and the sampling circuit 23 and synchronous detector 24 of the signal processing circuit in the optical measurement system.

As shown at (a) in FIG. 2, the output X of the first photo detector 9 becomes $(1-\gamma)P_1(t)\cdot D_1(t)$ when the light source 1 is being driven, and it becomes $\gamma P_2(t)\cdot D_1(t)$ when the light source 2 is being driven. On the other hand, as shown at (b) in FIG. 2, the output Y of the photo detector 20 is such that the output of the photo detector 9 lags $\Delta T$ in time. The lag $\Delta T$ is principally caused in the transmission by the optical fibers, and is sufficiently shorter than the alternating period T of the signal sources. The output of the second detector 20 becomes $\gamma P_1(t)\cdot T_1(t)\cdot T_2(t)\cdot D_2(t)$ when the light source 1 is being driven, and $(1-\gamma)P_2(t)\cdot T_1(t)\cdot T_2(t)\cdot A(t)\cdot D_2(t)$ when the light source 2 is being driven. Except in the portion of the time lag $\Delta T$, accordingly, the logarithm of the ratio of the outputs of the photo detectors 20 and 9 or log Y/X becomes $$\log \frac{\gamma T_1(t) \cdot T_2(t) \cdot D_2(t)}{(1-\gamma)D_1(t)}$$

when the light source 1 is being driven, and it is independent of the output $P_1(t)$ of the light source 1.

When the light source 2 is being driven, the logarithmic ratio becomes $$\log \frac{(1-\gamma)T_1(t) \cdot T_2(t) \cdot D_2(t) \cdot A(t)}{\gamma D_1(t)},$$

which is also independent of the light source output $P_2(t)$.

In order to remove the period of time of $\Delta T$ in the sampling circuit for the purpose of making the signal unrelated to ΔT, the circuit is set so as to drive a sampling gate at a time separate from the period of time of ΔT. The output of the sampling circuit 28 accordingly becomes as shown at (c) in FIG. 2. This output shown at (c) is subjected to the synchronous detection. A difference signal between the optical output during the drive of the light source 1 and the optical output during the drive of the light source 2 is detected, the detection output $E_O(t)$ being:

$$E_0(t) = \left| \log \frac{(1-\gamma)T_1(t) \cdot T_2(t) \cdot A(t) \cdot D_2(t)}{\gamma D_1(t)} - \log \frac{\gamma T_1(t) \cdot T_2(t) \cdot D_2(t)}{(1-\gamma)D_1(t)} \right|$$

$$= \log \left| \frac{(1-\gamma)^2}{\gamma^2} A(t) \right|$$

It is independent of $T_1(t)$, $T_2(t)$, $D_1(t)$ and $D_2(t)$, and is a function of only the change $A(t)$ of the measured object and the reflection factor of the beam splitter 7. Here, since the reflection factor $\gamma$ is constant, all the variable factors other than the change $A(t)$ of the measured object are removed.

Although, in the embodiment, the component for distributing each light beam into the optical fiber 10 and the photo detector 9 is based upon the construction of the beam splitter such that the proportion of the distribution is made $\gamma:(1-\gamma)$, it is possible to equalize the quantities of the distribution of each of the two light beams 4 and 5 into the optical fiber 10 and the photo detector 9. In this case, the output $E_O(t)$ becomes log $A(t)$.

Figures 4, 5:
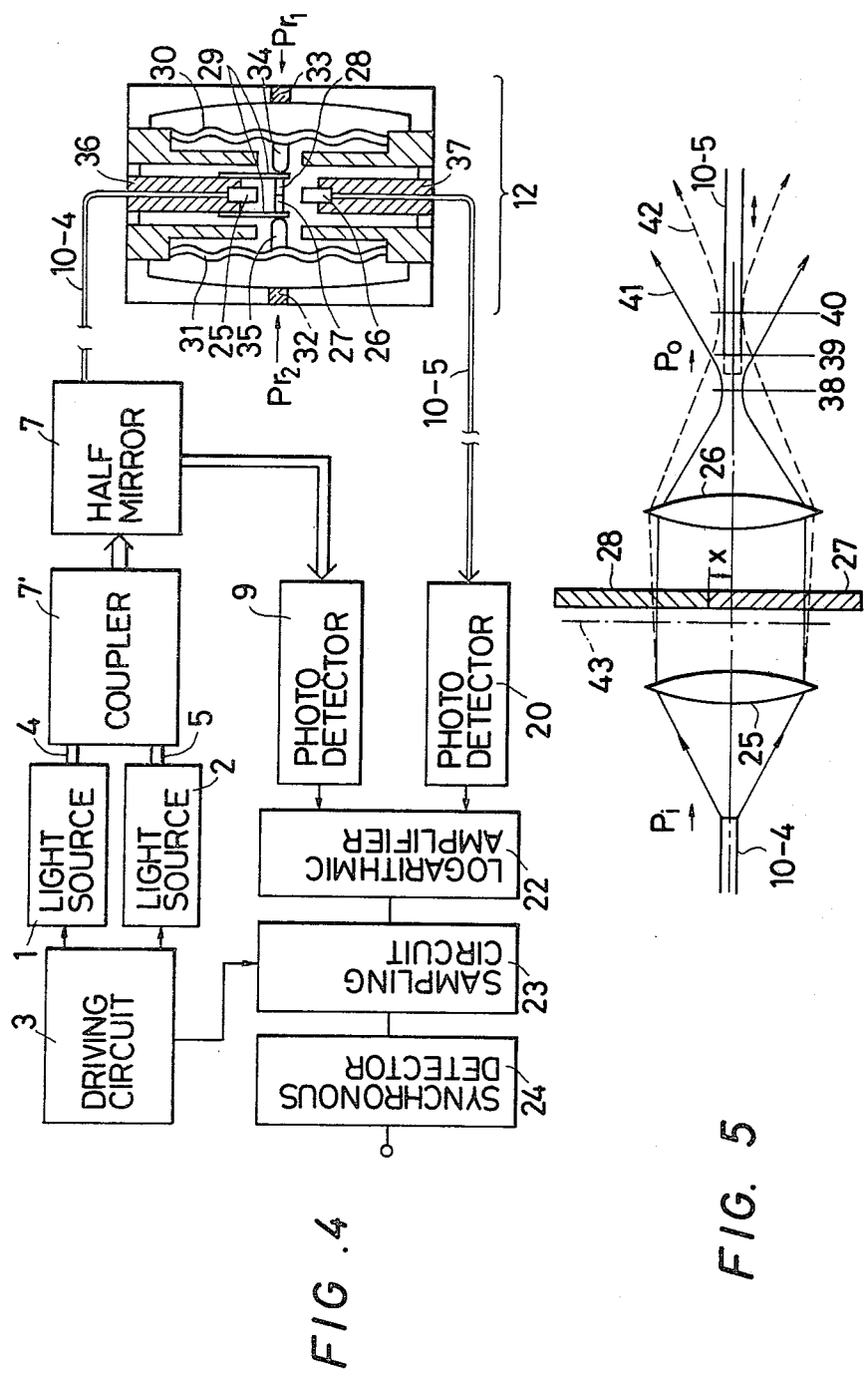
FIGS. 4 and 5 are diagrams each of which shows the construction of a transducer constituting a measuring portion in another embodiment.

FIG. 4 is a diagram which shows the construction of another embodiment of the optical measurement system according to this invention.

Output light beams 4 and 5 from respective light sources 1 and 2 are once coupled by an optical coupler 7', whereupon the coupled light beam is split into an optical fiber 10-4 and a photo detector 9 by a half mirror or beam splitter 7. The optical coupled 7' can be constructed by employing e.g., an optical filter (dichroic mirror) which transmits the light of the light source 1 and reflects the light of the light source 2.

A measuring portion 12 is made up of a lens 25 which converts into a collimated beam the light transmitted by the optical fiber 10-4, a displacement plate which includes in combination at least a filter 27 adapted to transmit the light of wavelength $\lambda_1$ and to stop the light of wavelength $\lambda_2$ and a filter 28 adapted to transmit the light of wavelength $\lambda_2$ and to stop the light of wavelength $\lambda_1$ and which is movable in the direction orthogonal to the collimated beam, a lens 26 which focuses the collimated beam with its light quantity varied by the displacement plate and couples it into an optical fiber 10-5, a supporter 29 which supports the displacement plate, pressure introducing ports 32 and 33 which apply pressures $P_{r1}$ and $P_{r2}$ to respective diaphragms 31 and 30, coupling bars 34 and 35 which apply changes of the diaphragms 30 and 31 to the displacement plate, and holders 36 and 37 which hold the respective optical fibers 10-4 and 10-5. The supporter 29 is constructed of leaf springs. When the displacement plate 27, 28 is displaced by the coupling bar 34 or 35, it is displaced while maintaining a parallelogram owing to the leaf springs 29, so that no angular oscillation appears with respect to an optic axis.

An optical signal transmitted through the optical fiber 10-5 from the measuring portion 12 is processed by a signal processing circuit similar to that shown in FIG. 1.

An output from the first photo detector 9 becomes $\gamma P_1(t) \cdot D_1(t)$ while the light source 1 is being driven, and becomes $\gamma P_2(t) \cdot D_2(t)$ while the light source 2 is being driven. On the other hand, an output from a second photo detector 20 becomes $(1-\gamma)P_1(t) \cdot T_1(t) \cdot T_2(t) \cdot D_2(t) \cdot S_1$ while the light source 1 is being driven, and it becomes $(1-\gamma)P_2(t) \cdot T_1(t) \cdot T_2(t) \cdot D_2(t) \cdot S_2$ while the light source 2 is being driven. Here, $S_1$ denotes the transmission factor of the measuring portion 12 during the drive of the light source 1, and $S_2$ the transmission factor thereof during the drive of the light source 2. Accordingly, an output from a logarithmic amplifier circuit 22 becomes log $$\frac{(1-\gamma)T_1(t) \cdot T_2(t) \cdot D_2(t) \cdot S_1}{\gamma D_1(t)} \text{ and}$$

$$\log \frac{(1-\gamma)T_1(t) \cdot T_2(t) \cdot D_2(t) \cdot S_2}{\gamma D_1(t)}$$

while the light sources 1 and 2 are being driven, respectively. The difference between these values is sampled by a sampling circuit 23, and an output $E_0$ from a synchronous detector 24 becomes $E_0 = \log (S_1/S_2)$.

FIG. 5 shows the construction of essential portions of a differential type displacement-light transducer for use in the measuring portion of an embodiment such as in FIG. 4 with the transducer serving for subjecting lights of different wavelengths to complementary variations such that an increase of one of the lights causes a decrease in the other light. The light $P_i(t)$ emergent from the transmitting optical fiber 10-4 is converted into a collimated light beam with a lens 25 and the quantity of transmitted light is modulated by a displacement plate including optical filters 27 and 28 in combination. The modulated light is condensed and caused to enter the returning-path optical fiber 10-5 by a lens 26, and an output $E_0$ proportional to the quantity of displacement x of the displacement plate is obtained. The components of FIG. 5 having the same reference numerals as in FIG. 4 have substantially the same functions as in the aforedescribed figure. The operation will now be described in more detail.

Letting $S_1$ and $S_2$ denote the tranmission factors of the displacement-light transducer for the respective wavelengths $\lambda_1$ and $\lambda_2$, they are expressed by:

$$S_1 = \frac{r_{11} + r_{21}}{2} + \frac{r_{11} - r_{21}}{\pi} \left[ \sin^{-1}\left(\frac{x}{r}\right) + \frac{x}{r} \cos\left(\sin^{-1}\left(\frac{x}{r}\right)\right) \right]$$

$$S_2 = \frac{r_{22} + r_{12}}{2} - \frac{r_{22} - r_{12}}{\pi} \left[ \sin^{-1}\left(\frac{x}{r}\right) + \frac{x}{r} \cos\left(\sin^{-1}\left(\frac{x}{r}\right)\right) \right]$$

Here $r_{11}$ and $r_{21}$ denote the transmission factors of the filters 27 and 28 for the light of the wavelength $\lambda_1$, respectively; $r_{12}$ and $r_{22}$ denote the transmission factors of the filters 27 and 28 for the light of the wavelength $\lambda_2$, respectively; r denotes the radius of the collimated beam; and x denotes the displacement from an axis. In a case where the filter 27 transmits only the light of the wavelength $\lambda_1$ and the filter 28 transmits only the light of the wavelength $\lambda_2$, that is, where $r_{11}=r_{22}=1$ and $r_{21}=r_{12}=0$, the out $E_0$ becomes:

$$E_0 = A\left\{ \frac{8}{\pi}\left(\frac{x}{r}\right) + \frac{4}{3\pi}\left(\frac{32}{\pi^2} - 1\right)\left(\frac{x}{r}\right)^2 \right\} \quad (1)$$

Here, A denotes a constant. The beam radius r can vary due to a change in the state of the light transmission within the optical fiber. In such a case, desirably a pinhole plate or a light transmitting window 43 is inserted, for example, between the lens 25 and the displacement plate composed of the filters 27 and 28 so as to maintain the radius of the light beam impinging on the displacement plate constant.

Figure 6:
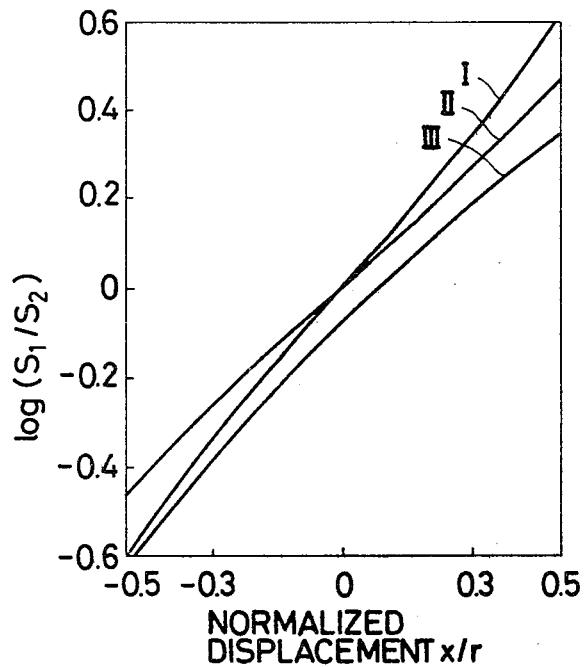
FIG. 6 is a diagram which illustrates the relationship between the displacement and the measured output as based on the transducer shown in FIG. 4.

FIG. 6 illustrates the relationship between the noramlized displacement (x/r) with the displacement x normalized by the radius r of the light beam and the output $E_0$. In the figure, I corresponds to the case were $r_{11}=r_{22}=1$ and $r_{21}=r_{12}=0$. II corresponds to a case where $r_{11}=r_{22}=0.9$ and $r_{21}=r_{12}=0.1$, and III corresponds to a case where $r_{11}=r_{22}=0.1$, $r_{21}=0$ and $r_{12}=0.2$.

As apparent from the figure, the relationship becomes almost rectilinear in a range of normalized displacements of $|x/r| < 0.3$.

When the displacement x is zero, $S_1$ and $S_2$ are equal and $A \log (T_1/T_2) = E_0 = 0$ holds, so that the detection of the zero point can be easily accomplished.

With the present embodiment, accordingly, in spite of the use of the logarithmic amplifier in the signal processing circuit, the displacement x and the output $E_0$ vary rectilinearly. This provides the advantage that an anti-logarithmic transformer etc., need not be used in the signal processing circuit.

In a case where the characteristics of the optical components such as the optical coupler and optical branch in the signal sending portion and the optical fibers 10-4 and 10-5 have influences which are not negligible, depending on the difference of the wavelengths of the lights, the transmission factors become different depending on the wavelengths while the lights emitted from the light sources are transmitted to the photo detector 20. In this case, letting k denote the ratio between the transmission factors for the lights of the two wavelengths $\lambda_1$ and $\lambda_2$, Equation (1) becomes:

$$E_0 = A\left\{ \frac{8}{\pi}\left(\frac{x}{r}\right) + \frac{4}{3\pi}\left(\frac{32}{\pi^2} - 1\right)\left(\frac{x}{r}\right)^3 \right\} + A \log k \quad (2)$$

In this case, it can occur that the zero point of the output and the zero point of the displacement do not agree and that the range of rectilinear changes around the zero point becomes narrow.

In this case, however, corrections can be made by exploiting the deviation of a focal position ascribable to the chromatic abberations of the lenses 25 and 26. Referring to FIG. 5, the light of the wavelength $\lambda_1$ of the lights emergent from the optical fiber 10-4 is focused on a point 38 as indicated by solid lines 41, whereas the light of the wavelengths $\lambda_2$ is focused on a point 40 as indicated by broken lines 42. Accordingly, when the transmission ratio k is 1 (one), the entrance end of the optical fiber 10-5 may be brought to a position 39 intermediate between the points 38 and 40. When the transmission ratio k is not 1, the entrance end of the optical fiber 10-5 is moved leftwards when the transmission factor of the light of the wavelength $\lambda_1$ indicated by the solid lines 41 is higher, and it is moved rightwards in the converse case, whereby the transmission ratio as the whole system can be made 1. Thus, the zero point can be corrected, and the recilinear range from the zero point can be expanded.

Figure 7:
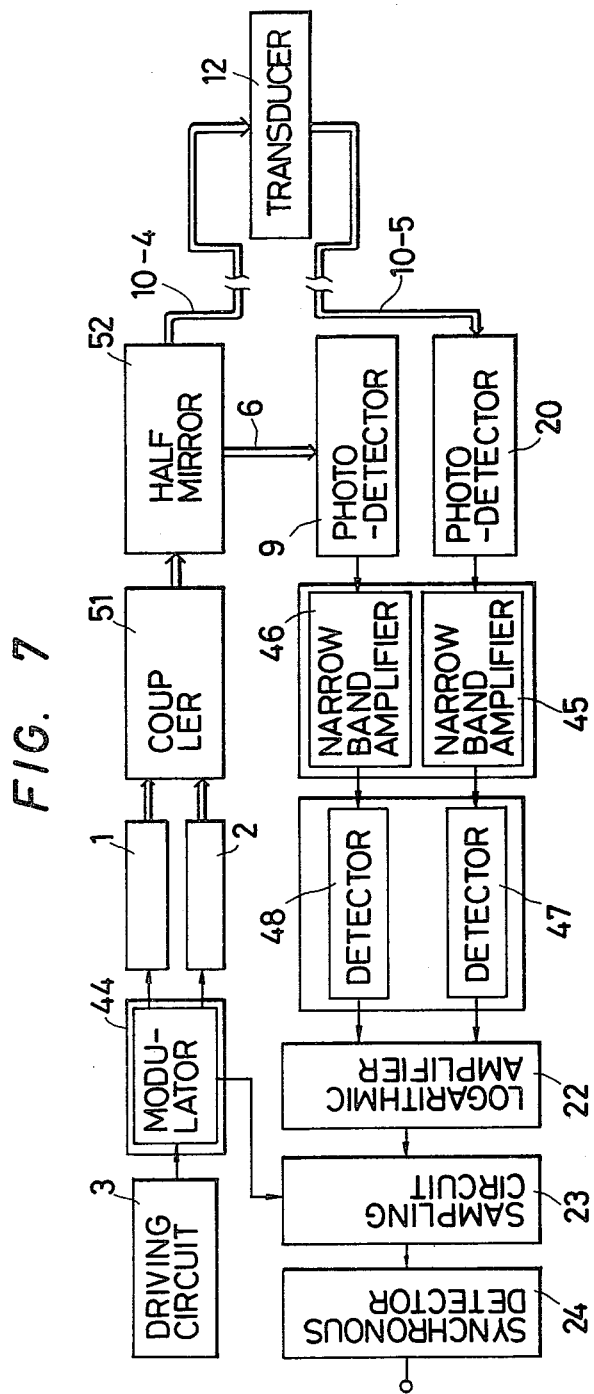
FIG. 7 is a block diagram which shows the construction of another embodiment of this invention.

FIG. 7 shows the construction of another embodiment of the optical measurement system according to this invention. It is especially adapted to eliminate the influence of background light and the influence of a dark current in the photo detector. When, in the arrangement of the embodiment in FIG. 1, the photo detector 20 includes a dark current $\Delta I_s$, the outputs of the photo detector 20 for the optical signals of the wavelengths $\lambda_1$ and $\lambda_2$, respectively, are as follows:

$$Y_1 = P_1(t) \cdot (1-\gamma) \cdot T_1(t) \cdot T_2(t) \cdot S_1 \cdot D_1(t) + \Delta I_s$$

$$Y_2 = P_2(t) \cdot (1-\gamma) \cdot T_1(t) \cdot T_2(t) \cdot S_2 \cdot D_1(t) + \Delta I_s$$

Accordingly, the outputs of the logarithmic amplifier 22 become:

$$X_1 = G \log \frac{(1-\gamma) T_1(t) \cdot T_2(t) \cdot D_1(t) \cdot S_1}{\gamma D_2(t)} + \frac{\Delta I_s}{P_1(t) \gamma D_2(t)}$$

and $$X_2 = G \log \frac{(1-\gamma) T_1(t) \cdot T_2(t) \cdot D_1(t) \cdot S_2}{\gamma D_2(t)} + \frac{\Delta I_s}{P_2(t) \gamma D_2(t)}$$

Therefore, especially when a signal current is small, it can occur that the output $E_0$ does not become zero in spite of the displacement x being zero.

In order to solve such a problem, according to the present embodiment, a type of modulator circuit, i.e., a circuit 44 which interrupts emitted lights from light-emissive members 1 and 2 at a frequency $f_c$ being much higher than the switching frequency $f_n$ of the alternate driving circuit 3 is disposed between the alternate driving circuit 3 and the light emitting members 1 and 2, and narrow-band amplifiers 45 and 46 having a center frequency equal to the frequency $f_c$ and a band width of $2 \cdot f_n$ and detectors 47 and 48 are respectively connected in cascade between photo detectors 20 and 9 and a logarithmic amplifier 22 in a received signal-processing portion. Reference numerals 51 and 52 indicate an optical coupler and a half mirror or beam splitter, respectively. The same reference numerals as utilized in the foregoing embodiment indicate components having the same functions.

Thus, output currents from the detectors 47 and 48 are respectively expressed by the following equations when the light emitting source 1 emits the light:

$$X_1 = P_1(t) \cdot (1-\gamma) \cdot D_1 \cdot G_1 \cdot S_1'$$

$$Y_1 = P_1(t) \cdot \gamma \cdot T_1(t) \cdot T_2(t) \cdot D_2 \cdot S_1 \cdot G_2 \cdot S_2'$$

They are respectively expressed as follows when the light emitting source 2 emits the light:

$$X_2 = P_2(t) \cdot (1-\gamma) \cdot D_1 \cdot G_1 \cdot S_1'$$

$$Y_2 = P_2(t) \cdot \gamma \cdot T_1(t) \cdot T_2(t) \cdot D_2 \cdot S_2 \cdot G_2 \cdot S_2'$$

Here, $G_1$ and $G_2$ denote the gains of the narrow-band amplifiers 46 and 45, respectively, and $S_1'$ and $S_2'$ denote the detection sensitivities of the detectors 48 and 47, respectively.

Accordingly, the output $E_0$ of the synchronous detector 24 having passed through the logarithmic amplifier 22 is expressed by the following equation owing to an operation similar to that explained with reference to FIG. 1:

$$E_0 = \log(S_1/S_2)$$

In accordance with the present embodiment, there can be realized an optical measurement system which can eliminate the influences of background light currents and dark currents on the photo detectors 20 and 9 and in which dispersions in the characteristics of the narrow-band amplifiers and the detectors used for the elimination of the influences do not affect the output of the system.

In the foregoing embodiments, the optical signals from the light sources have been described with regard to operations where the lights of the different wavelengths are alternately generated in equal periods and where the operation of the optical differential device is perfectly complementary, that is, the increment of one light and the decrement of the other light are equal. This invention, however, is not restricted to such embodiments.

Figure 8:
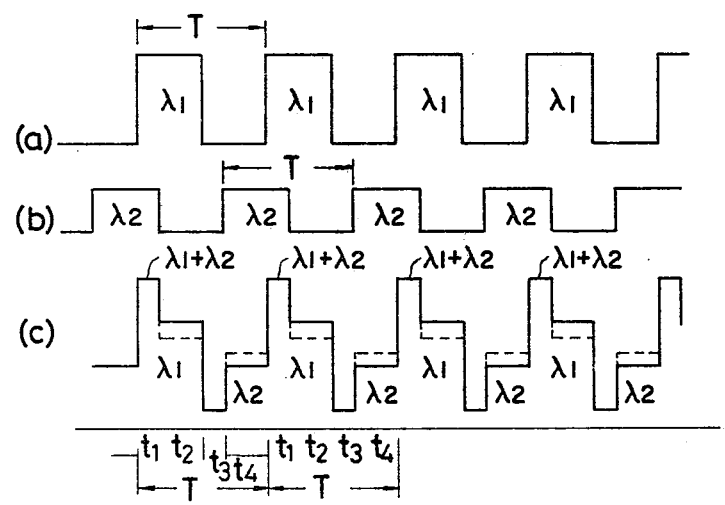
FIGS. 8, 9 and 10 are waveform diagrams of signals for use in the optical measurement system according to this invention.
Figure 9:
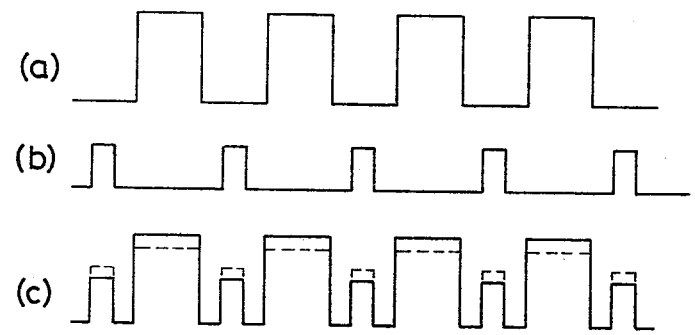
Figure 10:
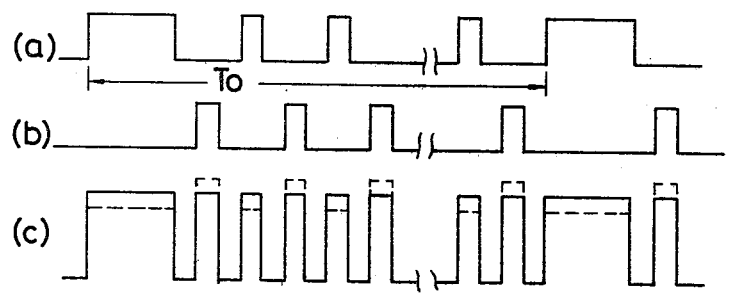

FIGS. 8, 9 and 10 are diagrams which show waveforms of optical signals in other embodiments. In any of the figures, (a) and (b) indicate signals of wavelengths $\lambda_1$ and $\lambda_2$, respectively, (c) indicates a transmission signal with the signals (a) and (b) combined, and dotted lines indicate a state in which an output of the measuring portion has changed due to the optical differential means (a case where the signal of the wavelength $\lambda_1$ has increased is shown). The amplitude of the composite signal (c) is shown enlarged for illustration purposes.

FIG. 8 illustrates a case where the recurrence periods of the lights (a) and (b) of the two wavelengths are equal, the duty ratio is 50% and the phases shift by $\theta$ from each other. Thus, the composite signal (c) has its period T composed of an interval $t_1$ of components $\lambda_1 + \lambda_2$, an interval $t_2$ of the component $\lambda_1$, an interval $t_3$ having neither of the components $\lambda_1$ and $\lambda_2$ and an interval $t_4$ of the component $\lambda_2$.

In FIG. 9, the periods of signals of $\lambda_1$ and $\lambda_2$ are equal and are T, and the duty cycles of $\lambda_1$ and $\lambda_2$ are 50% and 15%, respectively.

In FIG. 10, a synchronizing signal is inserted every fixed time $T_0$ of a signal of $\lambda_1$, the periods of $\lambda_1$ and $\lambda_2$ are equal and are T, and the duty ratio is 25%.

By sampling the outputs of these signals from the optical differential device in predetermined periods, the signals of $\lambda_1$, of $\lambda_2$, of $\lambda_1 + \lambda_2$ and without $\lambda_1$ and $\lambda_2$ can be separated. The signals of $\lambda_1$ and $\lambda_2$ are processed in the same way as in the case of the foregoing embodiments, the signal of $\lambda_1 + \lambda_2$ is used for monitoring the total optical output, and the signal in which neither $\lambda_1$ nor $\lambda_2$ exists is exploited as a signal for compensating for the dark current of the photo detector or the zero drift of the amplifier, whereby a more effective signal processor circuit can be constructed. Encoded optical signals, etc., can be used besides the examples described above.

In accordance with the present invention, the light source signals may be such that when pulse-shaped signals of two different wavelengths have been combined, the states in which optical signals of only $\lambda_1$ and only $\lambda_2$ are being transmitted are regularly arrayed.

Although, in the foregoing embodiments, the optical differential devices have been primarily described for use with a transmission type filter, it is apparent from the previous description that the invention is not limited thereto and even an optical differential device which includes reflector plates of different reflection factors for different wavelengths $\lambda_1$ and $\lambda_2$ in combination may be utilized.

Figure 11A:
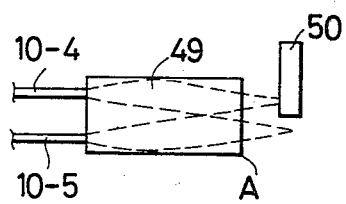
FIGS. 11A, 11B and 11C are constructional views of the essential parts of further embodiments of transducers for use in the optical measurement system of this invention.
Figure 11B:
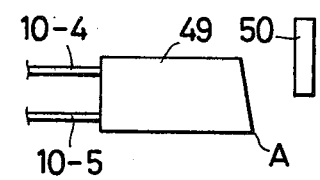
Figure 11C:
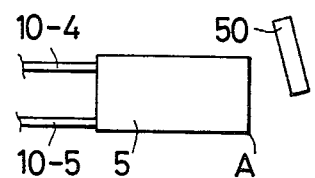

FIGS. 11A, 11B and 11C are views each showing the construction of essential components in the case where an optical differential device of the reflection type is utilized. In the figures, 10-4 and 10-5 designate sending and returning path optical fibers, respectively. Numeral 49 designates a cylindrical lens which has a refractive index profile. The lens 49 focuses light from the sending fiber 10-4 and delivers it from an end face A as a collimated beam having a fixed extent, and it focuses an input from the end face A and introduces it into the returning fiber 10-5. Numeral 50 indicates a reflector plate which exhibits different reflection factors in dependence on wavelengths. In each figure, reflected light from the reflector plate 50 enters the lens 49 in the form of a collimated beam being axially symmetrical with respect to the optic axis of the lens, and it has a focus at the coupling point between the fiber 10-5 and the lens 49. Accordingly, the relative positions of the two fibers 10-4 and 10-5 are axially symmetrical with respect to the optic axis of the lens 49, and the spacing between the fibers is determined by the distance between the face A of the lens 49 and the reflective face of the reflector plate 50. Especially in FIG. 11B, the the face A of the lens 49 extends at an incline to the optic axis, and the reflected light at the face A is focused on a part other than the end face of the fiber 10-5. In FIG. 11C, the reflective face of the reflector plate 50 is arranged at an incline to the optic axis, whereby the signal light from the reflective face is focused on a part other than a position which is axially symmetric to the fiber 10-5 with respect to the optic axis.

The spread of the light beam can be controlled in such a way that a light transmitting window such as the pin-hole plate 43 shown in FIG. 5 is interposed between the end face A of the cylindrical lens 49 and the reflector plate 50.

As set forth above in connection with the embodiments of this invention, in the system according to this invention, the transmission system and the measuring portion are constructed perfectly optically, so that the system is not affected by surrounding electrical conditions and that any danger due to sparks etc., is prevented. Moreover, a machine, etc., which is operating at all times is not required, so that accidents, faults, etc., are extremely rare, which is very effective for maintenance purposes.

Letting $X_1$ and $X_2$ denote the outputs of the first photo detector 9 for the respective optical signals of different wavelengths and $Y_1$ and $Y_2$ denote the outputs of the second photo detector 20 for them, the detection output is obtained as a function of $Y_1 X_2 / Y_2 X_1$. Therefore, the time variations of the light sources, the transmission lines and the photo detectors are eliminated, and an accurate instrumentation can be realized. Further, when the measuring portion is constructed with an optical differential device, the signal processing circuit can be precisely and simply constructed.

While we have shown and described various embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. An optical measurement system comprising:
   (a) optical signal source means for generating first and second pulse-shaped optical signals of different wavelengths,
   (b) an optical differential means for converting the physical change of a measured object into a displacement and for differentially varying the quantities of different wavelengths,
   (c) first and second photodetector means for converting the output lights of said optical signal source means and said optical differential means into input electric signals, respectively,
   (d) optical transmission lines coupling said optical signal source means and said optical differential means, and for coupling said optical differential means and said second photodetector means, respectively, and
   (e) a signal processing circuit means for a measurement output indicative of the physical change of the measured object as a function of the output electric signals of said first and second photodetector means for the first optical signal and an output ratio of said output electric signals of said first and second photodetector means for the second optical signal.

2. An optical measurement system according to claim 1, further comprising
   a single alternate driving signal source for alternately driving said first and second light sources,
   means for modulating said first and second pulse-shaped optical signals at a frequency higher than the frequency of said single alternate driving source, and wherein
   band amplifiers and detectors are connected in cascade to outputs of said first and second photodetector means, respectively.

3. An optical measurement system according to claim 1, wherein said optical transmission line means includes at least a first optical fiber for coupling said optical source means and said measuring means and at least a second optical fiber for coupling such measuring means and said second photo detector means.

4. An optical measurement system according to claim 3, wherein said optical differential means includes first optical lens means for converting the light emergent from said at least first optical fiber of said optical transmission line means into a collimated beam, second optical lens made for focusing the collimated beam on an entrance end of said at least second optical fiber of said optical transmission line means, and a displacement plate arranged between the first and second lenses and orthogonally thereto for moving a boundary of two filters of different transmission wavelength regions about an optic axis of said first and second optical lenses.

5. An optical measurement system according to claim 4, wherein the entrance end of said at least second optical fiber is movable in an axial direction of said first and second optical lenses.

6. An optical measurement system according to claim 3, wherein said optical differential means includes a cylindrical lens for converting the light beam of one of said at least first and second optical fibers of said optical transmission line means into a collimated beam and being disposed at an end part of said one of said at least first and second optical fibers, a reflector plate disposed on an output side of said cylindrical lens, for movement in accordance with the change of the measured object, such reflector plate exhibiting different reflection factors in dependence on wavelengths, and the other of said at least first and second optical fibers being disposed in a focused part of the light beam from said reflector plate as formed by said cylindrical lens.

7. An optical measurement system according to claim 4, further comprising a light transmitting window disposed one of directly before and behind said displacement plate for controlling the extent of the light beam converted into the collimated beam.

8. An optical measurement system according to claim 6, further comprising a light transmitting window fixed to said cylindrical lens and disposed between said cylindrical lens and said reflector plate for controlling the extent of the light beam converted into the collimated beam.

* * * * *